US009022868B2

(12) United States Patent
Borst

(10) Patent No.: US 9,022,868 B2
(45) Date of Patent: May 5, 2015

(54) METHOD AND SYSTEM FOR CREATING A VIRTUAL WORLD WHERE USER-CONTROLLED CHARACTERS INTERACT WITH NON-PLAYER CHARACTERS

(75) Inventor: Karl Joseph Borst, Woodbridge (CA)

(73) Assignee: Ganz, Woodbridge, Ontario ( * ) Notice: Subject to any disclaimer, the term of this patent is extended or adjusted under 35 U.S.C. 154(b) by 50 days.

(21) Appl. No.: 13/370,964

(22) Filed: Feb. 10, 2012

(65) Prior Publication Data

US 2012/0208642 A1 Aug. 16, 2012

Related U.S. Application Data

(60) Provisional application No. 61/441,466, filed on Feb. 10, 2011.

(51) Int. Cl.
  *A63F 9/00* (2006.01)
  *A63F 13/30* (2014.01)

(52) U.S. Cl.
  CPC ......... *A63F 13/12* (2013.01); *A63F 2300/5553* (2013.01); *A63F 2300/5566* (2013.01); *A63F 2300/575* (2013.01); *A63F 2300/638* (2013.01); *A63F 2300/69* (2013.01)

(58) Field of Classification Search
  None
  See application file for complete search history.

(56) References Cited

U.S. PATENT DOCUMENTS

| 5,682,469 A | 10/1997 | Linnett et al. |
| 5,736,982 A | 4/1998 | Suzuki et al. |
| 5,880,731 A | 3/1999 | Liles et al. |
| 5,886,697 A | 3/1999 | Naughton et al. |
| 6,219,045 B1 | 4/2001 | Leahy et al. |
| 6,253,167 B1 | 6/2001 | Matsuda et al. |
| 6,311,195 B1 | 10/2001 | Hachiya et al. |
| 6,349,301 B1 | 2/2002 | Mitchell et al. |
| 6,388,665 B1 | 5/2002 | Linnett et al. |
| 6,396,509 B1 | 5/2002 | Cheng |

(Continued)

FOREIGN PATENT DOCUMENTS

| GB | 2365364 | 2/2002 |
| JP | 2001321571 A | 11/2001 |

(Continued)

OTHER PUBLICATIONS

World of Warcraft Manual—2004.

(Continued)

*Primary Examiner* — Seng H Lim
(74) *Attorney, Agent, or Firm* — Pearne & Gordon LLP

(57) ABSTRACT

A method of providing an interactive virtual environment is provided. The method includes using a computer system to receive registration information, establish an account for a user and associating a virtual character with the account. In response to an interaction between the virtual character and a non-player character in the virtual environment, task information is served over the communication network for presenting the user controlling the virtual character with a request from the non-player character to perform a task. An invitation is received over the communication network inviting at least one additional virtual character to participate in performing the task. In response to receiving an acceptance of the task on behalf of the additional virtual character, task content is served over the communication network to allow both the virtual character and the additional virtual character to take actions to perform the task included in the request.

16 Claims, 10 Drawing Sheets

(56) References Cited

U.S. PATENT DOCUMENTS

| | | |
|---|---|---|
| 6,476,830 B1 | 11/2002 | Farmer et al. |
| 6,493,001 B1 | 12/2002 | Takagi et al. |
| 6,519,771 B1 | 2/2003 | Zenith |
| 6,559,863 B1 | 5/2003 | Megiddo |
| 6,677,968 B1 | 1/2004 | Appelman |
| 6,734,884 B1 | 5/2004 | Berry et al. |
| 6,734,885 B1 | 5/2004 | Matsuda |
| 6,772,195 B1 | 8/2004 | Hatlelid et al. |
| 6,845,486 B2 | 1/2005 | Yamada et al. |
| 6,910,186 B2 | 6/2005 | Kim |
| 6,948,131 B1 | 9/2005 | Neven et al. |
| 6,951,516 B1 | 10/2005 | Eguchi et al. |
| 7,012,602 B2 | 3/2006 | Watson et al. |
| 7,058,897 B2 | 6/2006 | Matsuda |
| 7,062,722 B1 | 6/2006 | Carlin et al. |
| 7,086,005 B1 | 8/2006 | Matsuda |
| 7,139,796 B2 | 11/2006 | Rekimoto et al. |
| 7,143,358 B1 | 11/2006 | Yuen |
| 7,155,680 B2 | 12/2006 | Akazawa et al. |
| 7,168,051 B2 | 1/2007 | Robinson et al. |
| 7,181,690 B1 | 2/2007 | Leahy et al. |
| 7,210,104 B2 | 4/2007 | Nakagawa |
| 7,288,028 B2 | 10/2007 | Rodriquez et al. |
| 7,342,587 B2 | 3/2008 | Danzig et al. |
| 7,425,169 B2 | 9/2008 | Ganz |
| 7,442,108 B2 | 10/2008 | Ganz |
| 7,465,212 B2 | 12/2008 | Ganz |
| 7,493,558 B2 | 2/2009 | Leahy et al. |
| 7,534,157 B2 | 5/2009 | Ganz |
| 7,568,964 B2 | 8/2009 | Ganz |
| 7,587,338 B2 | 9/2009 | Owa |
| 7,604,525 B2 | 10/2009 | Ganz |
| 7,618,303 B2 | 11/2009 | Ganz |
| 7,823,074 B2 | 10/2010 | Takemura et al. |
| 8,118,673 B2 | 2/2012 | Coleman et al. |
| 2002/0054094 A1 | 5/2002 | Matsuda |
| 2002/0100040 A1 | 7/2002 | Bull |
| 2002/0113809 A1 | 8/2002 | Akazawa et al. |
| 2002/0130894 A1 | 9/2002 | Young |
| 2003/0065721 A1 | 4/2003 | Roskind |
| 2004/0143852 A1 | 7/2004 | Meyers |
| 2004/0189702 A1 | 9/2004 | Hlavac et al. |
| 2005/0182693 A1 | 8/2005 | Alivandi |
| 2005/0272504 A1 | 12/2005 | Eguchi et al. |
| 2006/0003824 A1* | 1/2006 | Kobayashi et al. ............... 463/1 |
| 2006/0123127 A1 | 6/2006 | Littlefield |
| 2006/0205461 A1* | 9/2006 | LaRocca et al. ............... 463/1 |
| 2006/0224971 A1 | 10/2006 | Paulin et al. |
| 2006/0242632 A1 | 10/2006 | Orsolini et al. |
| 2006/0259957 A1 | 11/2006 | Tam et al. |
| 2007/0021200 A1 | 1/2007 | Fox et al. |
| 2007/0050716 A1 | 3/2007 | Leahy et al. |
| 2007/0143679 A1 | 6/2007 | Resner |
| 2008/0046458 A1 | 2/2008 | Tseng et al. |
| 2008/0120558 A1 | 5/2008 | Nathan et al. |
| 2008/0215973 A1 | 9/2008 | Zalewski et al. |
| 2008/0215974 A1 | 9/2008 | Harrison et al. |
| 2008/0250332 A1 | 10/2008 | Farrell et al. |
| 2009/0125819 A1 | 5/2009 | Hamilton, II et al. |
| 2009/0144638 A1 | 6/2009 | Haggar et al. |
| 2009/0204420 A1 | 8/2009 | Ganz |
| 2009/0254843 A1 | 10/2009 | Van Wie et al. |
| 2009/0305774 A1* | 12/2009 | Farone et al. ............... 463/25 |
| 2010/0041481 A1 | 2/2010 | Smedley et al. |
| 2010/0056243 A1* | 3/2010 | Czyzewski et al. ............. 463/16 |
| 2011/0201415 A1* | 8/2011 | Gagner et al. ............... 463/25 |
| 2012/0108306 A1* | 5/2012 | Munsell et al. ............... 463/9 |
| 2012/0122552 A1* | 5/2012 | Youm ............................. 463/23 |
| 2012/0252570 A1* | 10/2012 | Kwant et al. ............... 463/29 |

FOREIGN PATENT DOCUMENTS

| | | |
|---|---|---|
| JP | 2001522498 A | 11/2001 |
| JP | 2002063092 | 2/2002 |
| WO | 9942917 A2 | 8/1999 |
| WO | 0133327 A1 | 5/2001 |
| WO | 2006128224 A1 | 12/2006 |

OTHER PUBLICATIONS

Eve Online—Wikipedia, Feb. 3, 2011.
Intl Search Report—PCT-CA2009-000271, dated Sep. 7, 2010.
Shining Stars—Shiningstars.com/parents Jun. 25, 2008.
Evaluation Personal Agent—Matsuda, Apr. 2001.
"The Sims Booklet," dated 2000.

* cited by examiner

METHOD AND SYSTEM FOR CREATING A VIRTUAL WORLD WHERE USER-CONTROLLED CHARACTERS INTERACT WITH NON-PLAYER CHARACTERS

CROSS-REFERENCE TO RELATED APPLICATIONS

This application claims the benefit of U.S. Provisional Application No. 61/441,466, filed Feb. 10, 2011, which is incorporated in its entirety herein by reference.

BACKGROUND OF THE INVENTION

1. Field of the Invention

This application relates generally to a method and system for providing a virtual presentation with a three-dimensional ("3D") interface, and more specifically to method and system for providing content to a user computer that allows a user of the user computer to participate in activities in the virtual presentation, alone or as part of a team, involving a non-player character.

2. Description of Related Art

Traditional virtual worlds have offered users a static menu of games or other activities. Users can select from this menu one or more games to be played for entertainment purposes. Users may be able to compete against each other in the available games and activities, or competition is can be limited to comparing the score each user achieves in a game to that of other users in the same game. Although the games or other activities in such menus may be updated over time by an administrator of the virtual world, such games and activities are offered universally to all users within the virtual world. Thus, regardless of each user's experience or skill level, those users are all presented with the same games and activities.

Other virtual worlds may offer games of varying degrees of difficulty. Typically, advanced users who have developed an expertise for a particular game can manually elect to participate in a version of the game that is more difficult than a version of the game a novice would select. However, the selection of the difficulty is input manually by users, and the limited number of difficulty levels available may render such manually-input difficulty selections inappropriate for some users.

BRIEF SUMMARY OF THE INVENTION

Accordingly, there is a need in the art for a method and system for generating a virtual world in which users can participate in activities presented by non-player characters, optionally as part of a team.

According to one aspect, the subject application involves a method of providing an interactive virtual environment. The method includes, with a computer system, receiving registration information and establishing an account for a user. The computer system associates a virtual character with the account and transmits content over a communication network for moving the virtual character in the virtual environment in response to control commands input by a user. The computer system also transmits content over the communication network for providing a non-player character in the virtual world, where the non-player character is controlled by information transmitted by the computer system and not by the user in the virtual world. A request is received over the communication network to interact the virtual character with the non-player character in the virtual world. In response to an interaction between the virtual character and the non-player character, task information is served by the computer system over the communication network for presenting the user controlling the virtual character with a request from the non-player character to perform a task. An invitation is received over the communication network inviting an additional virtual character to participate in performing the task. And, in response to receiving an acceptance of the task on behalf of the additional virtual character, task content is served over the communication network to allow both the virtual character and the additional virtual character to take actions to perform the task included in the request.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Figure 1:
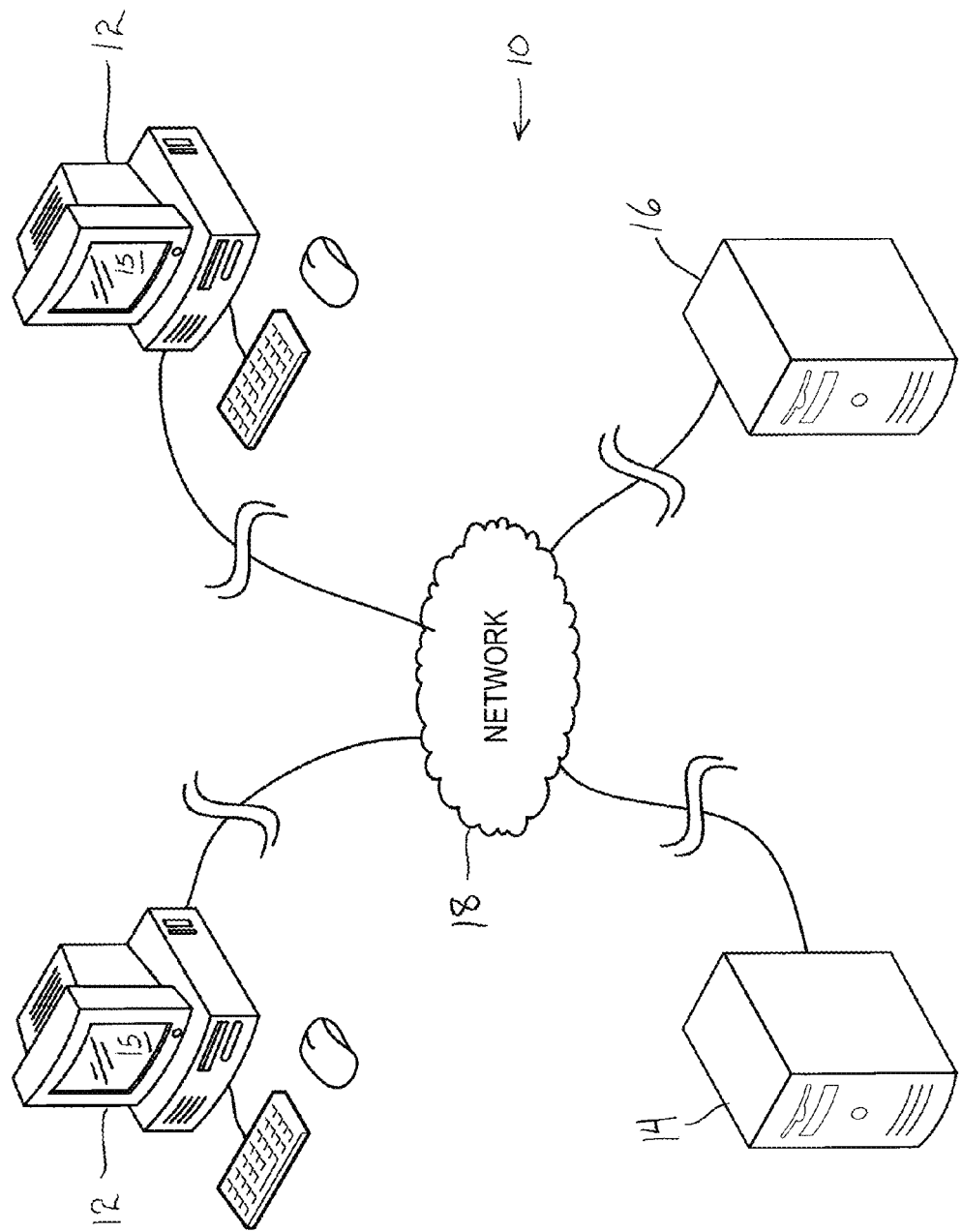
FIG. 1 shows an illustrative embodiment of a computer system for providing a virtual world in which users can participate, optionally as a team, in an activity.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

FIG. 1 shows an illustrative embodiment of a computer system 10 for providing a virtual world in which users can participate, optionally as a team, in an activity. As shown, the computer system 10 includes at least one, and optionally a plurality of user computers 12, each remotely located from one another. For instance, the user computers 12 can each optionally be located at a different home, in a different geographic location, where different users of the virtual world reside. Each user computer 12 can be a general purpose computer including a non-transitory computer-readable memory such as a hard disk drive storing computer executable instructions, and a processing component that is operable to execute the computer-executable instructions. A monitor 15 or other suitable display device is operable to display the virtual world to the users, and an optional speaker can generate audible output relating to the portions of the virtual world displayed by the monitor 15.

The user computers 12 can communicate with a storage server 14 and a content server 16 over a communication network 18. Registration server 14 receives communications transmitted by the user computers 12 over the communication network 18. For instance, the information input by users using the user computers 12 during the registration process described below is transmitted to the registration server 14. White the user computers 12 the registration server 14 also includes a processing component and a non-transitory computer readable memory such as a hard disk drive. A database of valid registration codes, an algorithm for identifying a valid registration code, or a combination thereof can be stored by the hard disk drive provided to the registration server 14. Computer executable instructions also stored by the hard drive provided to the registration server 14 are executable by the processing component of the registration server 14 to evaluate registration information such as a registration code received via the communication network 18 in determining whether such information is valid.

The content server 16 is configured to serve content over the vacation network 18 to be received by the user computers 12. The content server 16 can be a web server, for example, including a processing component that executes computer-executable instructions stored on a hard drive to transmit website content according to the HTTP via the communication network 18. Access to the website content, or a portion thereof, provided by the content server 16 can optionally be restricted, and limited to those who have paid a fee to acquire a registration code that has been successfully validated by the registration server 14.

Although the registration server 14 and the content server 16 are shown in FIG. 1 as separate components forming part of a distributed network, it is to be understood that the registration server 14 and the content server 16 can be implemented with a single server terminal, or a plurality of server terminals. The plurality of server terminals can optionally be located at different geographic locations, and optionally designated to service those geographic locations and geographic locations nearby.

An example of the communication network can include a wide area network ("WAN") such as the Internet, a local area network ("LAN") such as localized 802.11 wireless communication networks and Ethernet networks, or a combination thereof.

Figure 2:
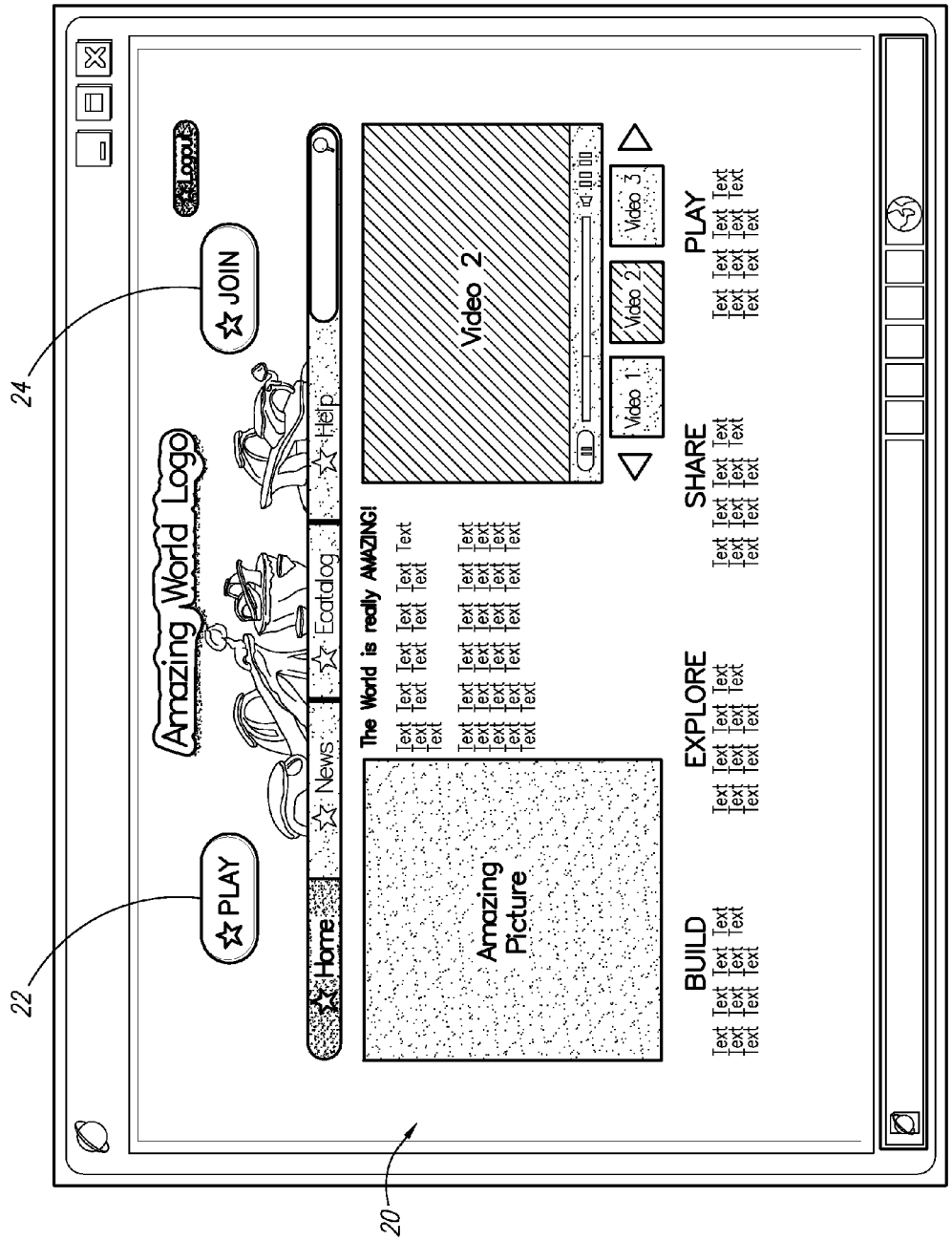
FIG. 2 shows an illustrative embodiment of a splash screen where users are presented options to revisit and join a virtual world.

Users can access the virtual world by entering a uniform resource locator ("URL") into a web browser application running on the user computer 12, for example. In response to entering the URL the user computer 12 can access the content at the network address associated with that URL, can be stored by the memory provided to the content server 16. The content server 16 can serve content over the communication network 18 required by the user computer 12 to display the splash screen 20 appearing in FIG. 2. The splash screen 20 includes a play option 22 to be selected by users who are already members of the virtual world to revisit the virtual world. Such users will enter wall began information such as a username and password combination, for example, to access their accounts.

Figure 3:
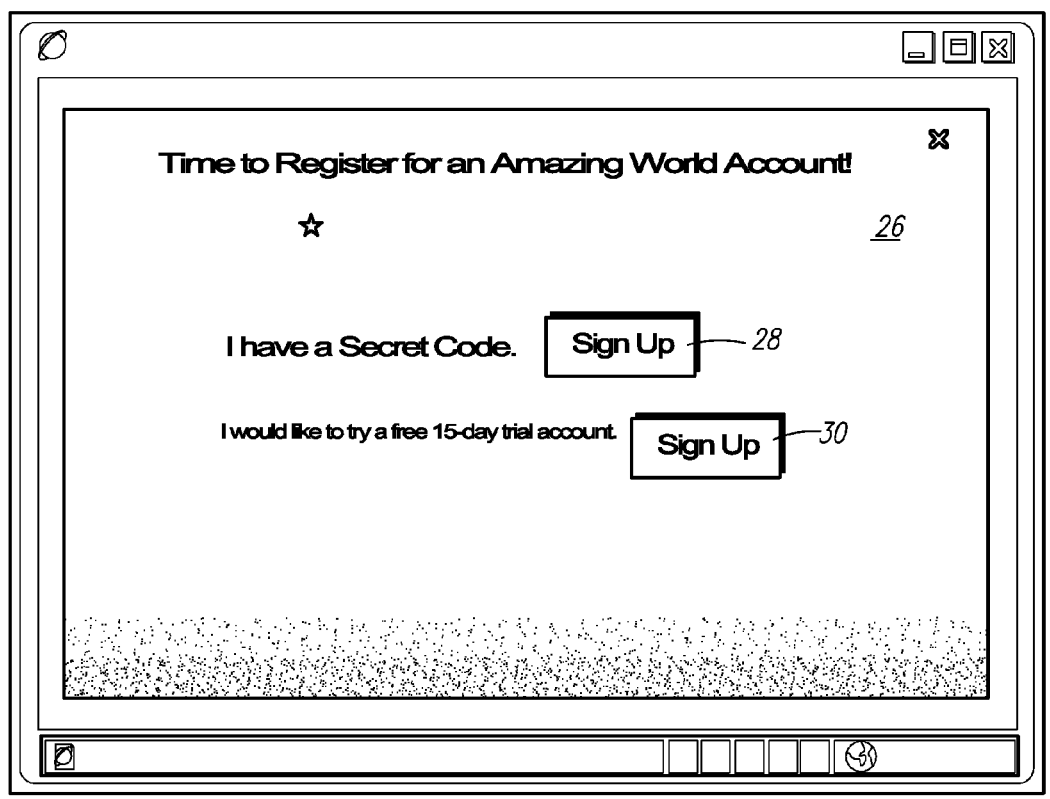
FIG. 3 shows an illustrative embodiment of registration screen for joining a virtual world.

On the other hand, users who wish to join the virtual world can select the join option 24. In response to selecting the join option 24, the content server 16 can serve content over the communication network 18 to allow the user computer 12 to the display a screen 26 (FIG. 3) presenting the user the option 28 to become a full, paid member and the option 30 to join on a trial basis. To become a paid member, a user is required to enter into the user computer 12 a registration code or other information purchased by the user. For example, user may have purchased toy such as a stuffed animal, for example, bearing a tag with a secret code printed thereon. Although the user technically purchased the stuffed animal rather than purchasing the code by itself, the secret code is considered to be part of the purchase, and is considered to have been purchased by the user for a fee.

Users who are unsure whether they want to purchase the right to access the virtual world as a paid member, can select the option 30 to join the virtual world on a trial basis. Users who join on a trial basis can optionally be granted restricted access to the virtual world. Restricted access can include at least one of: gaining access to less than all of the content within the virtual world that is accessible by paid members, and gaining access to the virtual world for a limited period of time, such as 15 days for example.

Figure 4:
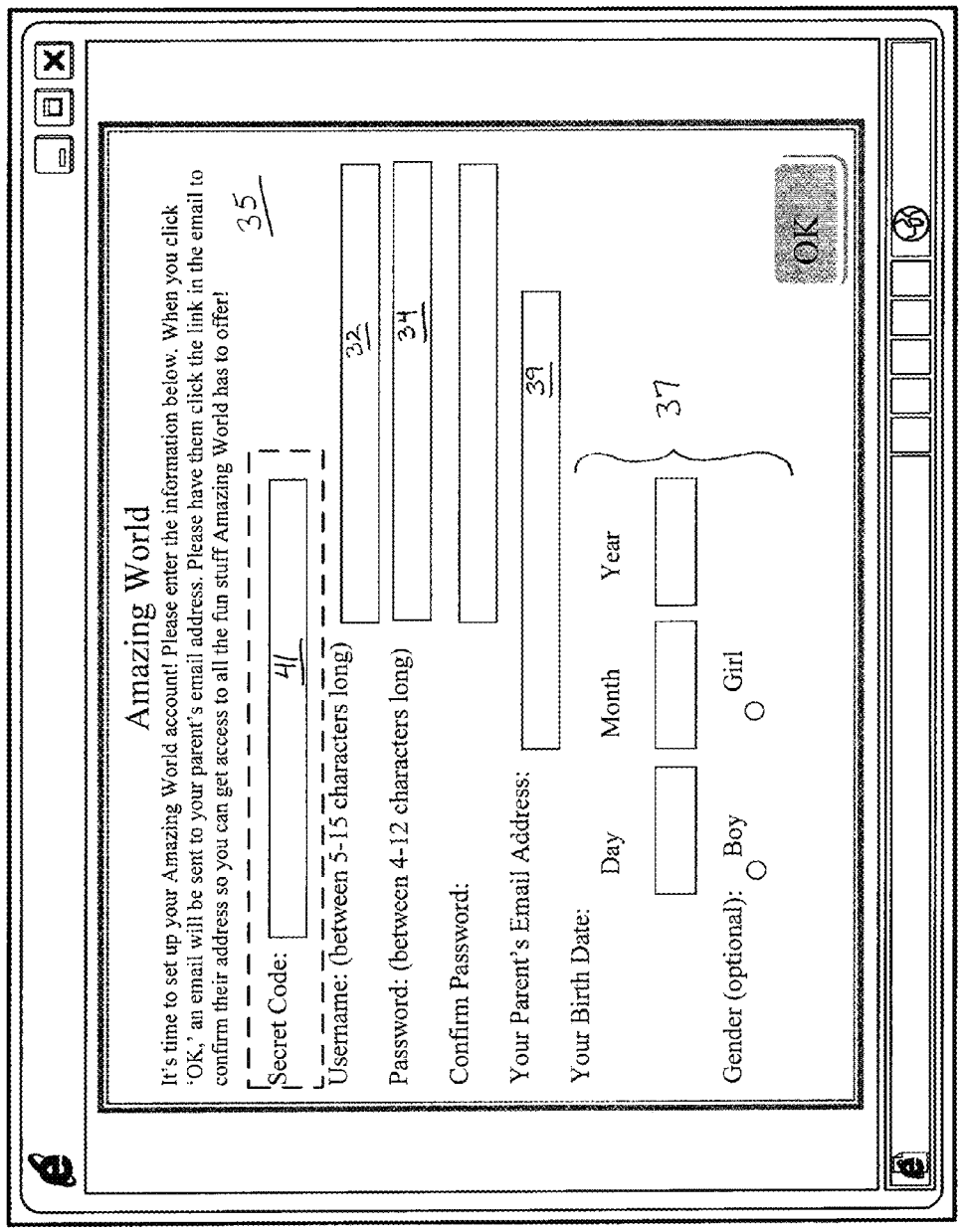
FIG. 4 shows an illustrative embodiment of a registration data form for joining a virtual world.

Whether joining as a paid member or on a trial basis, the user is presented a virtual form 35 (FIG. 4) transmitted to, and displayed by the user computer 12 requesting information about the user. The user is prompted to enter login information such as a username in the username field 32 and the password in the password field 34. Upon subsequently returning to the virtual world after the registration process is complete, this login information can be entered by the user to regain access to the virtual world via a user account created on behalf of the user during registration. In addition to the login information, the virtual form 35 includes background information 37 about the user such as the user's birthday and gender.

The virtual form 35 also includes a contact field 39 in which the user is to enter an e-mail address or other contact information of a parent or other legal custodian. As part of the registration process, an e-mail or other electronic communication will be transmitted by the registration server 14 to the parent or legal guardian associated with the e-mail address or other contact information. This e-mail or other electronic communication also includes a hyperlink to a website where the parent or legal guardian can enter their approval that the user be granted access to the virtual world. E-mail or other electronic communication can include instructions for confirming the parent's or legal guardian's consent instead of, or in addition to the hyperlink. Until the parent's or legal guardian's consent is received, the user will be granted restricted access to the virtual world.

For those who elect to join as paid members, a code field 41 will be included as part of the virtual form 35. The registration code accompanying the stuffed animal or other information suitable to establish that the user has indeed paid a fee required to gain access to the virtual world as a paid member is to be entered into this code field 41. The registration code or other information entered into the code field 41 is transmitted to the registration server 14 via the communication network 18 for validation. Just as for those who elect to join on trial basis, those wishing to join as paid members are also required to submit the e-mail address or other contact information in the contact field 39. Even though such users have paid the fee, consent from a parent or other legal guardian is also required prior to gaining full access to all content within the virtual world.

Figure 5:
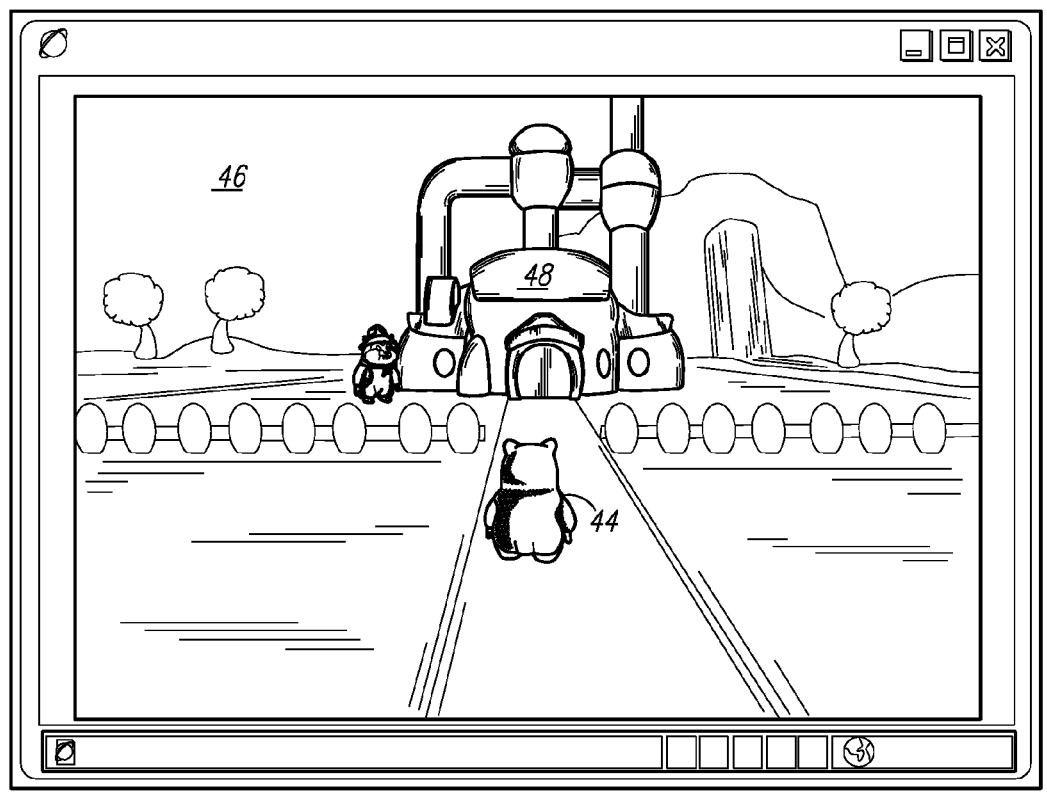
FIG. 5 shows an illustrative embodiment of a home zone in which a virtual character controlled by a user is located.

Once the user has registered, either as a paid member or on a trial basis, the user is granted access to control a virtual character 44 (FIG. 5) in the virtual world. As shown in FIG. 5, content is served from the content server 16 over the communication network 18 to be received by the user computer 12 to present the virtual character 44 in a home zone 46 associated with that virtual character 44. The home zone 46 includes a virtual structure such as a home 48 belonging to the virtual character 44 in the virtual world. The home zone 46 also includes an outdoor area such as a yard and optionally a garden belonging to the virtual character 44. The home zone 46 is specific to the virtual character 44, that is, the home zone 46 is not a public area such as a community, or public portion of the virtual world. In other words, only the user controlling the virtual character 44 and those other users who are invited or otherwise granted permission by the user controlling the virtual character 44 to visit the home zone 46 of the virtual character 44 may do so. According to alternate embodiments, however, the user controlling the virtual character 44 may elect to allow uninvited guest virtual characters controlled by other users to visit.

The home 48 can optionally be themed to reflect the appearance of the virtual character 44. For instance, the virtual character 44 can be a virtual hamster. Accordingly, the home 48 in the home zone 46 four that virtual hamster can have an appearance that at least somewhat resembles a tube maze commonly constructed for real-life hamsters. The home 48 can include an interior that is customizable by the user controlling the virtual character 44. The user can construct mazes by combining generally tubular maze segments and groom connectors that again have an appearance resembling the tubes and rooms, constructed for real-life hamsters. Other users who are invited to visit the home zone 46 can be granted access to such mazes within the home 48 thereby presenting challenges to the user's friends.

Figure 6:
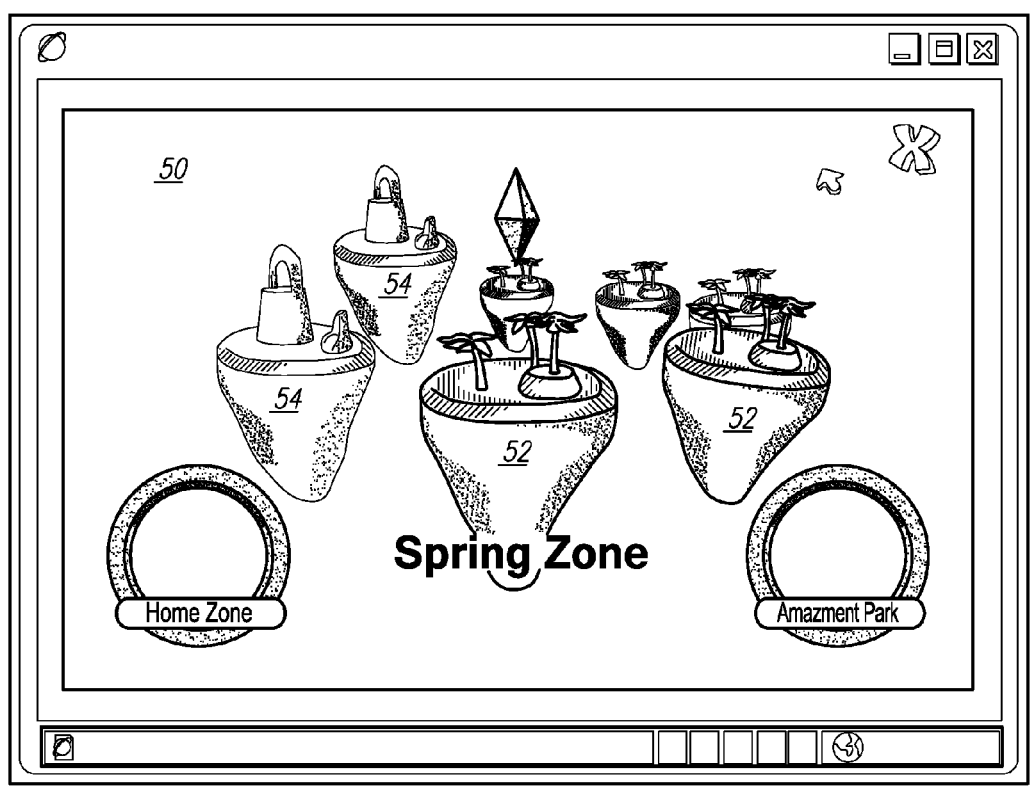
FIG. 6 shows an illustrative embodiment of a map of a virtual world.

In addition to the home zone 46, the virtual world includes a plurality of other zones that are publicly accessible by all members of the virtual world. FIG. 6 shows an illustrative embodiment of a world map 50 that can be used by the user to navigate between zones. As shown, the plurality of other zones include a plurality of unrestricted zones 52 to which users are granted access upon joining the virtual world and without satisfying any other criteria required to gain access to those unrestricted zones 52. Additionally a plurality of restricted zones 54 are included in the virtual world. Each restricted zone 54 requires the user controlling the virtual character 44 to satisfy at least one additional criterion is a prerequisite to gaining full access to those restricted zones 54. For example, the user may be required to achieve an experience level exceeding the threshold experience level for each of the restricted zones 54. According to another embodiment, the user controlling the virtual character 44 may be required to complete a predetermined task, or complete a collection within the virtual world as a condition to gaining access to a restricted zone 54.

The virtual character 44 can visit each of the other zones in the virtual world that have been unlocked, or otherwise rendered unrestricted. In the unlocked zones the virtual character 44 will occasionally encounter one or a plurality of different non-player characters ("NPC") 60. Rather than being controlled by a human user in real time by inputting commands via a user computer 12 at a time when an action by the NPC 60 is to be carried out, a NPC 60 is an automated character whose behavior is controlled by the execution of computer-executable instructions transmitted by the content server 16, locally residing on the user computer 12, or a combination thereof. The computer-executable instructions for each NPC 60 can be specified by a proprietor of the website comprising virtual world, for example, to establish a desired behavior for those NPC's 60.

Each zone within the virtual world can include at least one, and optionally a plurality of different NPCs 60. One or more of the NPCs 60 can optionally be found in two or more zones, and can optionally include an appearance consistent with a theme for a particular zone within the virtual world. For example, one of the zones within the virtual world can have an Arctic theme and an NPC 60 within that zone can have the appearance of a snowman.

Figure 7:
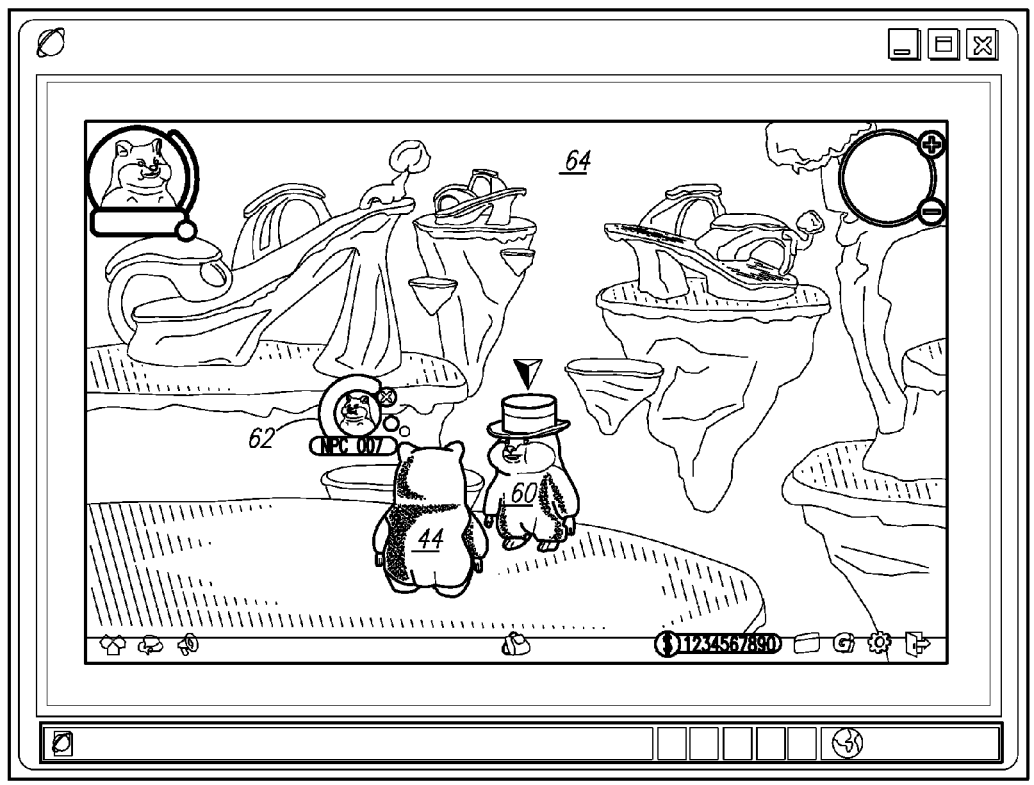
FIG. 7 shows an illustrative embodiment of a community zone in which a virtual character controlled by a user has encountered a non-player character.

When the virtual character 44 encounters a NPC 60 in a public zone 64 as shown in FIG. 7, an icon 62 can appear, providing an indication of the NPC's identity. The user can use an input peripheral provided to the user computer 12, such as a conventional mouse for example, to select the icon 62 and initiate an interaction with the NPC 60. Each interaction of the virtual character 44 with a particular NPC 60 is recorded in the user account to which the virtual character 44 is registered. The quantity and optionally the type (e.g., simply communicating with the NPC 60, giving a gift to the NPC 60, or honoring a request from the NPC 60, etc . . . ) of the interactions affect a relationship level between that particular NPC 60 and the virtual character 44. Additionally, other factors such as the manner in which a task is performed can serve to improve the relationship level between the virtual character 44 and the NPC 60 that assigned the task. For instance, the NPC's reaction to the completion of a task can vary depending on how the task is performed. For example, unbeknownst to the virtual character 44 (and possibly at least one additional virtual character as explained below) participating in a collection task during which jewels are to be collected, finding and collecting several pink jewels with the virtual character 44 will elicit a stronger reaction by the NPC 60 than finding and collecting green jewels. Finding and collecting the pink jewels can also improve the relationship level between the virtual character 44 and the NPC 60 to a greater extent than finding and collecting green jewels. The participants will learn of the NPC's preference at the conclusion of the task when the NPC 60 issues a reaction to the performance of the task. For example, a communication from the NPC 60 can include a comment praising the collection of pink jewels instead of green jewels, allowing the participants to get to know the NPC 60 that assigned the task. By learning to please the NPC, such as by collecting pink jewels, the participant can optionally receive prizes of greater value than if the participant collects all green jewels. But since the value of the different jewels is initially unknown, this allows the participants the opportunity to get to know the NPC. The relationship level is a measure of how familiar that particular NPC 60 and the virtual character 44 are with each other, and can affect the content of the communications as well as the tasks offered by the NPC 60 to the virtual character 44. The NPC 60 may also exhibit varying degrees of behavior (e.g., animation, reactions to the completion of a task, etc . . . ) when interacting with the virtual character 44 based on the relationship level 72.

Figure 8:
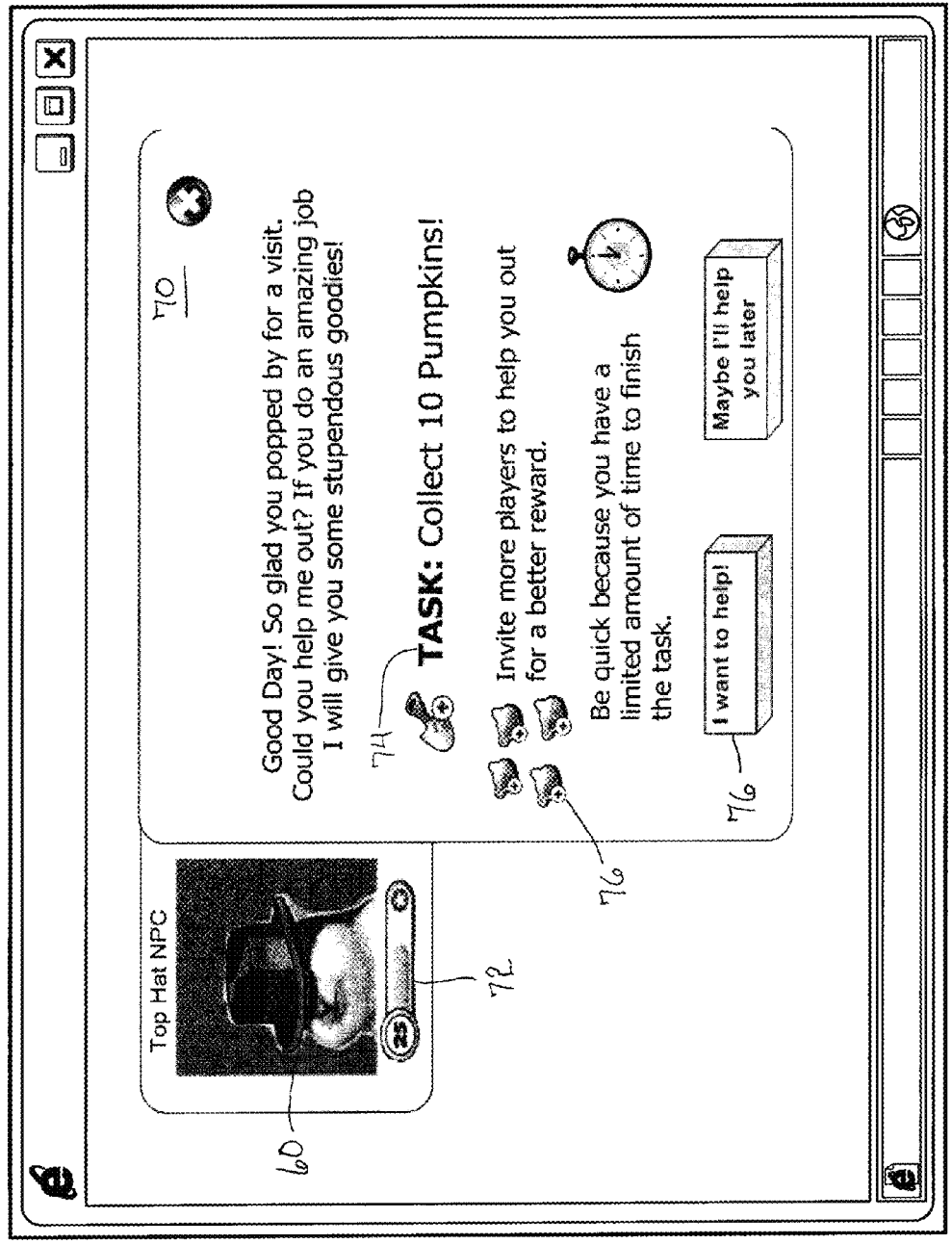
FIG. 8 shows an illustrative embodiment of a task interface presenting a task offered by the non-player character in FIG. 7 to the user, the task interface including an option that can be selected by the user to invite at least one, and optionally four additional users within the virtual world to participate in the task.

In response to the user selecting the icon 62, the content server 16 serves content that is to be displayed to the user via the user computer 12 as a communication from the NPC 60 to the virtual character 44. The communications from the NPC 60 can include a task assigned to the virtual character 44. FIG. 8 shows an illustrative embodiment of a communication window 70 displayed to the user by the user computer 12, including the content specified by the information served by the content server 16. In addition to the content of the communication, the communication window also includes a scale 72 or other suitable display indicating the relationship level between the virtual character 44 and the particular NPC 60 encountered by the virtual character 44.

According to the present embodiment, the content of the communication window 70 presents the user with a task 74. For this example, the task 74 is a scavenger hunt, requiring the user to move the virtual character 44 throughout the zone 64 and collect 10 pumpkins hidden throughout the zone 64 in which the virtual character 44 encountered the NPC 60. The user can elect to perform the task requested by the NPC alone by simply selecting a button 76 to initiate performance of the task 74. Upon selecting the button 76 the communication window 70 will close and the virtual character 44 will once again be displayed within the zone 64, where the virtual character 44 will move about in search of the pumpkins The virtual character 44 is given a predetermined time limit to complete the task and can collect each pumpkin simply by running into them as they are located. The time limit afforded for completion of the task can vary depending upon the experience level of the virtual character 44, the relationship level 72 between the virtual character 44 in the NPC 60 that assigned the task, or a combination thereof. For example, a virtual character 44 that has been registered in the virtual world for a significant period of time has a high experience level, and will be afforded less time than a novice to perform the task 74. Likewise, the virtual character 44 having the relationship level 72 shown in FIG. 8 will be given less time to perform the task than another virtual character having a lower relationship level.

According to alternate embodiments, the task 74 assigned by the NPC 60 can optionally vary depending upon the relationship level 72. For instance, the task 74 to collect 10 pumpkins may be assigned to the virtual character 44 having the relationship level 72 as shown in FIG. 8. In contrast, another virtual character having a lesser relationship level 72 than that shown in FIG. 8 maybe requested to collect five pumpkins instead, or may be requested to perform a "lesser" task for which a smaller prize than that awarded for collecting pumpkins is awarded if the task is successfully completed. Alternately, the other virtual character having the lesser relationship level may be assigned a completely different task 74 such as to compete in a race against the NPC 60. Generally speaking however, the lesser the relationship level 72 the easier the task 74 assigned by the NPC 60, and optionally the lesser the potential value of the prize to be awarded for successfully completing the task. Likewise, the greater the relationship level 72, the more difficult the task 75 is assigned by the NPC 60, and the greater potential for reward. Further, to keep the virtual world interesting, there may be a plurality of tasks 74 available to be assigned to the virtual character 44 for different ranges of the relationship level 72 and/or experience level. The content server 16 can serve content via the communication network 18 to allow the NPC 60 to randomly assign one of the plurality of tasks available for a given relationship level 72 to the virtual character 44. Thus, encountering the same NPC 60 with the virtual character 44 more than once with substantially the same relationship level 72 can result in a different task 74 being presented to the virtual character 44 each time. However, a recovery period during which the virtual character 44 can not encounter the NPC 60 to perform another task follows successful completion of the task 74. The user must wait until the recovery period expires before re-encountering that NPC 60 to perform another task and thereby earn a prize as a reward for successfully completing the task and bolstering the relationship level 72.

Figure 9:
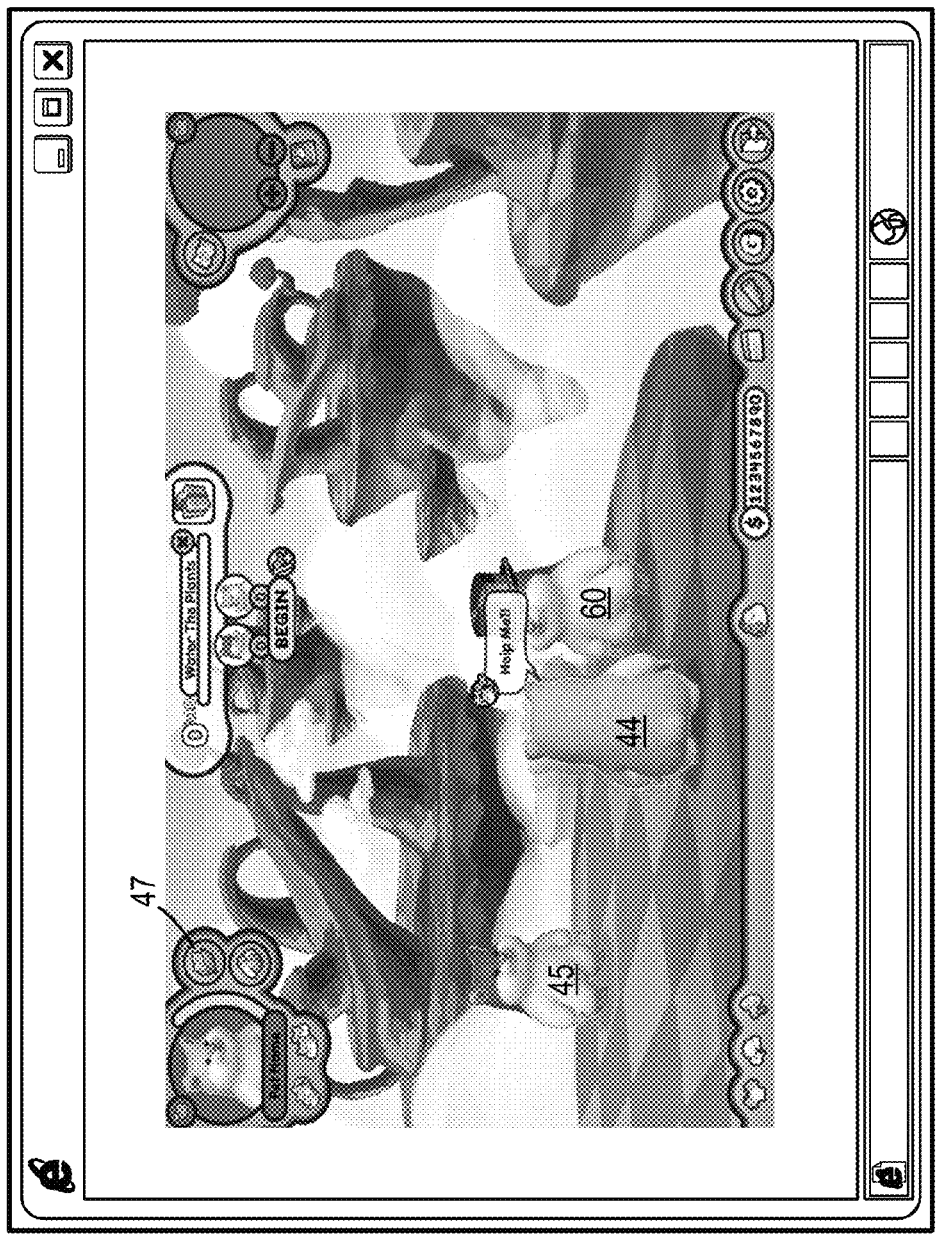
FIG. 9 shows an illustrative embodiment of a user inviting another user within a predetermined range relative to the non-player character to participate in the task.

Rather than performing the task 74 alone, the user can select an invite icon 76 to invite one or more other users registered in the virtual world to take part in the performance of the task 74. The user can invite more than one other user, but the number of other users that can be invited can optionally be capped, such as four or fewer. The user controlling the virtual character 44 that approached the NPC 60 can invite other users in a variety of different ways. For example, as shown in FIG. 9, another virtual character 45 within a predetermined proximity of the NPC 60 approached by the virtual character 44 can be selected by the user controlling the virtual character 44 using a mouse or other suitable computer input peripheral connected to the user computer 12. Only those virtual characters 45 within a predetermined distance of the NPC 60 and/or virtual character 44 are visible to the user control in the virtual character 44. Other virtual characters outside of this distance are not displayed by the user computer 12. The other virtual character 45 can be controlled by a user unknown to the user controlling the virtual character 44. According to alternate embodiments, the user controlling the virtual character 44 can access a list of other registered users in the virtual world known to the user controlling the virtual character 44 by selecting an icon 47. The list can be assembled by extending invitations to become friends to other users in the virtual world, by participating in a task 74 with another user in the virtual world, or any other desired manner.

In addition to the relationship level 72, the number of participants will affect at least one of: the task assigned, the goal of the task, the time afforded for completion of the task, the difficulty of the task, and the prize to be awarded for completion of the task. For example, Table 1 relates the number of participants for a task 74 to the goal (i.e., the number of objects that must be collected to successfully complete the task) of the task 74. According to an embodiment, a sole participant must collect only 10 objects (e.g., pumpkins) Two participants must collect a total of 25 objects between them within the time allotted. Three participants must collect a total of 40 objects between them within the time allotted, and so on.

TABLE 1

| # of players | # of objects to collect |
|---|---|
| 1 | 10 |
| 2 | 25 |
| 3 | 40 |

TABLE 1-continued

| # of players | # of objects to collect |
|---|---|
| 4 | 55 |
| 5 | 70 |
| 6 | 85 |

For tasks 74 involving multiple participants, each participant can optionally be required to contribute a certain amount to each task 74. For example, each of three participants in a task requiring collection of 40 pumpkins may be required to collect a minimum of five objects in order for the task 74 to be successfully completed. If each participant succeeds in collecting more than five objects in performing the task 74 each participant will be awarded a prize for completing that task 74. If, however, one of the three participants fails to collect at least five objects, the two participants who found at least their minimum requirement of five objects will be awarded a prize but the participant who failed to do so will not be awarded a prize. In such a circumstance, the total prize pool can be split two ways instead of three, or two thirds of the prize pool originally offered for completion of the task 74 can be awarded to the two who satisfied their quota. Alternate embodiments can optionally withhold a prize from all participants if at least one of the participants fails to find the minimum number of objects.

According to another embodiment, the time afforded for completion of the task 74 involving multiple participants can be greater than the time afforded for completion of the task 74 involving a sole participant. Table 2 shows how the time allotment for a task 74 can be scaled based on the number of participants. According to the present example, a solo participant required to collect 10 objects is afforded 2 min. to complete the task 74. Two participants, however, are required to collect 25 objects and are afforded 2 min. and 30 sec. to complete the task 74. Just as in other embodiments, each participant may be required to contribute a predetermined minimum amount towards completion of the task 74, and the prize awarded for successfully completing the task 74 can optionally be scaled based on the number of participants, the number of participants who satisfied their quota, or a combination thereof.

TABLE 2

| # of players | # of objects to collect | Time Limit |
|---|---|---|
| 1 | 10 | 2 mins |
| 2 | 25 | 2 mins 30 secs |
| 3 | 40 | 3 mins |
| 4 | 55 | 4 mins 30 secs |
| 5 | 70 | 5 mins |
| 6 | 85 | 5 mins 30 secs |

Table 3 provides an example of how prizes can be scaled based on the number of participants performing a task 74. As shown, a single participant can expect to earn 0 to 15 points for successfully completing the task 74. Two participants can expect to earn a total of 15 to 30 points between them for successfully completing the task 74. The total prize to be awarded to the participants can optionally be based on 100 point scale, with each participant adding approximately 20 points to the total prize pool.

TABLE 3

| Number of Players | Prize Value Range |
|---|---|
| 1 Player | 0-15 |
| 2 Player | 15-30 |
| 3 Player | 30-45 |
| 4 Player | 45-60 |
| 5 Player | 60-75 |
| 6 Player | 75-100 |

Regardless of how the prize is broken down, each point awarded can represent at least one of: an amount of virtual currency (i.e., not legal tender, but a monetary representation redeemable in the virtual world), a contribution toward the relationship level with the NPC 60 that assigned task 74, a contribution toward the experience level of the virtual character 44, and a virtual object to be used by the virtual character 44 in the virtual world.

According to alternate embodiments, one or more virtual characters 44 performing a task 74 can optionally compete against the NPC 60, and optionally one or more additional NPCs, such as in a race, for example. The number of NPCs competing may be scaled based on the number of user participants, and more NPC's can be entered in the race than need to beaten to successfully complete the task 74 (e.g., if at least two NPCs must be beaten, there can be three NPCs entered). And again, a minimum number NPCs that must be beaten for the task to be considered successfully completed can also optionally be scaled. The prize can also be split based on how the participants place relative to each other and/or the NPCs. Table 4 illustrates how the number of participants can affect such a task 74.

TABLE 4

| # of Players | # of NPC's to race | Time Limit | How you win |
|---|---|---|---|
| 1 Players | 1 | 2 minutes | Beat 1 NPC |
| 2 Players | 2 | 2.5 minutes | Beat at least one NPC. User who comes in first gets greater prize than second user. |
| 3 Players | 3 | 3 minutes | Beat at least two NPC's. User who comes in first gets greater prize. Other users get the same value prize. |
| 4 Players | 4 | 3.5 minutes | Beat at least three NPC's. User who comes in first gets a greater prize. The others get the same value prize. |
| 5 Players | 6 | 4 minutes | Beat at least three NPC's. User who comes in first gets the prize. The others get the same value prize. |
| 6 Players | 7 | 4.5 minutes | Beat at least three NPC's. User who comes in first gets the prize. The others get the same value prize. |

Figure 10:
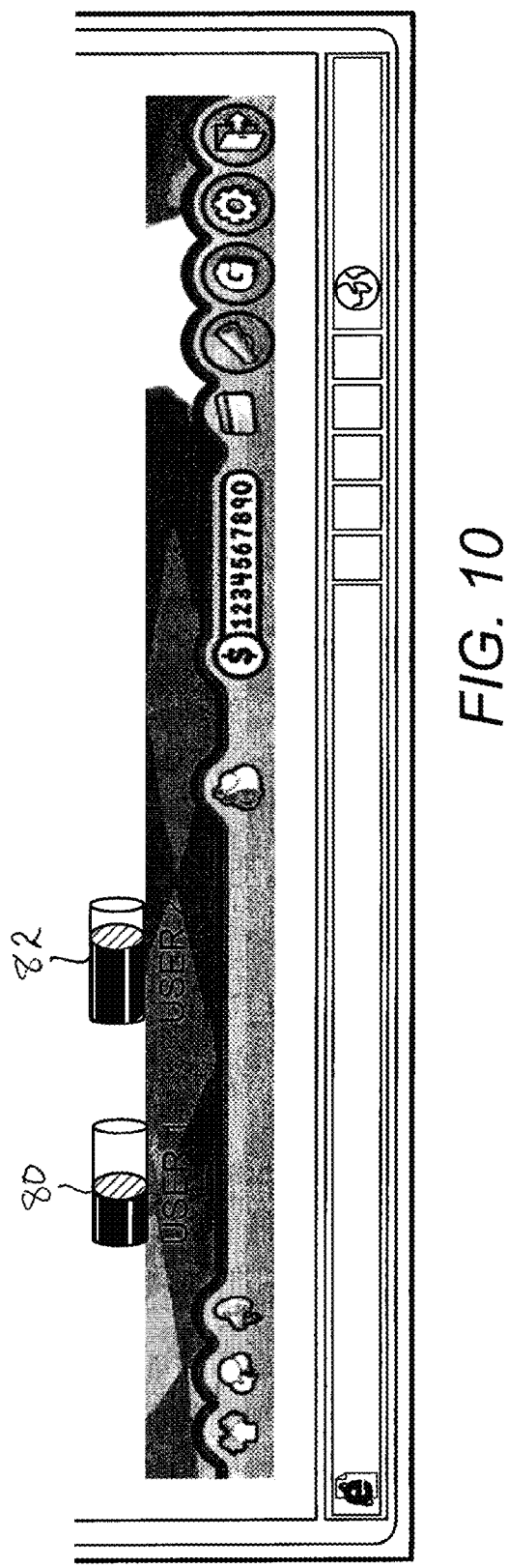
FIG. 10 shows n illustrative embodiment of a task status indicating progress made by each of two users who are together participating in a task.

For any of the multiple-participant tasks, content can be transmitted by the content server 16 to the user computer 12 indicating the performance of each participant relative to at least one other participant. For example, FIG. 10 shows an illustrative embodiment of a graphical scale 80 indicating that a first user has collected approximately half of the minimum quota to be collected by that user. Likewise the scale 82 indicates that a second user has collected approximately ¾ (75%) of the minimum quota of objects to be collected by the user to successfully complete the task 74. The scales 80, 82 can optionally be served to be visible to each user participating in the task 74 to give each user an idea of whether they are on pace to successfully complete the task 74 or not.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of providing an interactive virtual environment, the method comprising:
   with a computer system, receiving registration information and establishing an account for a user;
   the computer system associating a virtual character with the account and transmitting character content over a communication network for moving the virtual character in the virtual environment in response to control commands input by the user;
   transmitting NPC content over the communication network for providing a non-player character in the virtual world, where said non player character is controlled by said computer system and not by the user in the virtual world;
   receiving a request over the communication network to interact the virtual character with the non-player character in the virtual world;
   in response to an interaction between the virtual character and the non-player character, serving task information over the communication network for presenting the user controlling the virtual character with a request from the non-player character to perform a task, and transmitting content to present the user with an invitation tool that is selectable by the user after being presented with the task to extend an invitation to an additional virtual character controlled by another user to participate in performance of the task presented to the user;
   receiving the invitation over the communication network inviting the additional virtual character to participate in performing the task presented to the user controlling the virtual character;
   in response to receiving an acceptance of said invitation to participate in the performance of the task on behalf of said additional virtual character, serving task content over the communication network to allow both the virtual character and the additional virtual character to take actions to perform the task included in the request; and
   establishing a value for a variable parameter of the task after receiving said acceptance of the invitation, said value being specific to a number of virtual characters controlled by different users that have accepted an invitation to participate in performance of the task and where said value is established by selecting one of multiple different values available to be selected as the variable parameter for the task presented to the user.

2. The method of claim 1, wherein the registration information comprises a code accompanying a toy purchased for the user, and the virtual character comprises an appearance that resembles the toy.

3. The method of claim 1 further comprising limiting a number of invitees that can receive the invitation to participate in performing the task to less than a predetermined threshold.

4. The method of claim 3, wherein the predetermined threshold is 4 invitees.

5. The method of claim 1, wherein said establishing the value for the variable parameter comprises establishing a time limit among multiple different time limits for performing the task.

6. The method of claim 5, wherein the time limit for performing the task with a plurality of the virtual characters controlled by different users is longer than the time limit for performing the task with just the virtual character controlled by the user.

7. The method of claim 1 further comprising transmitting prize scaling information over the communication network for establishing a prize pool that is to be distributed to the virtual character and the additional virtual character in response to successful completion of the task, wherein a value of the prize pool is determined based at least in part on the number of virtual characters controlled by different users that participate in performing the task.

8. The method of claim 7, wherein the prize pool is divided equally among each of the virtual characters controlled by different users that participate in performing the task.

9. The method of claim 7, wherein the prize pool is prorated among each of the virtual characters controlled by different users that participate in performing the task based at least in part on a result of each an effort expended by each one of the virtual characters controlled by different users in performing the task.

10. The method of claim 1 further comprising:
    transmitting quota information over the communication network for establishing a of each of the virtual character and the additional virtual character toward successful completion of the task for the task to be considered successfully completed; and
    transmitting result information over the communication network indicating whether each of the virtual character and the additional virtual character satisfied the minimum contribution.

11. The method of claim 10 further comprising, in response to a failure of at least one of the virtual character and the additional virtual character to satisfy the minimum contribution, awarding a prize to another one of the virtual character and the additional virtual character that satisfied the minimum contribution without awarding the prize to the at least one of the virtual character and the additional virtual character that failed to satisfy the minimum contribution.

12. The method of claim 10 further comprising, in response to a failure of at least one of the virtual character and the additional virtual character to satisfy the minimum contribution, withholding a prize from both the virtual character and the additional virtual character.

13. The method of claim 1, wherein the task comprises a challenge involving a competition where at least one of the non-player character and a second non-player character competes against at least one of the virtual character and the additional virtual character.

14. The method of claim 1 further comprising maintaining a relationship level between the virtual character and the non-player character, wherein the relationship level is based on at least one of:
- a quantity of interactions between the virtual character and the non-player character,
- a type of each interaction between the virtual character and the non-player character; and
- a performance, by the virtual character, of a task assigned by the non-player character.

15. The method of claim 14, wherein the relationship level is based at least in part on the performance, by the virtual character, of the task assigned by the non-player character, and the performance of the task comprises a collecting a preferred object within the virtual environment instead of another object.

16. A method of providing an interactive virtual environment, the method comprising:
- with a computer system, receiving registration information and establishing an account for a user;
- the computer system associating a virtual character with the account and transmitting character content over a communication network for moving the virtual character in the virtual environment in response to control commands input by a user;
- transmitting NPC content over the communication network for providing a non-player character in the virtual world, where said non player character is controlled by said computer system and not by the user in the virtual world;
- receiving a request over the communication network to interact the virtual character with the non-player character in the virtual world;
- in response to an interaction between the virtual character and the non-player character, serving task information over the communication network for presenting the user controlling the virtual character with a request from the non-player character to perform a task;
- receiving an invitation over the communication network inviting an additional virtual character to participate in performing the task;
- in response to receiving an acceptance of said task on behalf of said additional virtual character, serving task content over the communication network to allow both the virtual character and the additional virtual character to take actions to perform the task included in the request; and
- transmitting goal scaling information over the communication network for establishing a goal that is to be accomplished by the virtual character and the additional virtual character for successful completion of the task, wherein the goal for the task is variable and scaled according to the goal scaling information based at least in part on a number of participants that participate in performing the task.

* * * * *

UNITED STATES PATENT AND TRADEMARK OFFICE
CERTIFICATE OF CORRECTION

| | | |
|---|---|---|
| PATENT NO. | : 9,022,868 B2 | |
| APPLICATION NO. | : 13/370964 | |
| DATED | : May 5, 2015 | |
| INVENTOR(S) | : Karl Borst | |

It is certified that error appears in the above-identified patent and that said Letters Patent is hereby corrected as shown below:

In the specification,
Column 2, line 58, "n" should read -- an --.

In the claims,
Column 12, line 34-39
"9. The method of claim 7, wherein the prize pool is pro-rated among each of the virtual characters controlled by different users that participate in performing the task based at least in part on a result of each an effort expended by each one of the virtual characters controlled by different users in performing the task." should be -- 9. The method of claim 7, wherein the prize pool is pro-rated among each of the virtual characters controlled by different users that participate in performing the task based at least in part on a result of an effort expended by each one of the virtual characters controlled by different users in performing the task. --.

Col. 12, line 40-49
"10. The method of claim 1 further comprising:
transmitting quota information over the communication network for establishing a of each of the virtual character and the additional virtual character toward successful completion of the task for the task to be considered successfully completed; and transmitting result information over the communication network indicating whether each of the virtual character and the additional virtual character satisfied the minimum contribution." should be -- 10. The method of claim 1 further comprising:
transmitting quota information over the communication network for establishing a minimum contribution required of each of the virtual character and the additional virtual character toward successful completion of the task for the task to be considered successfully completed; and transmitting result information over the communication network indicating whether each of the virtual character and the additional virtual character satisfied the minimum contribution. --.

Signed and Sealed this
Seventeenth Day of November, 2015

Michelle K. Lee
*Director of the United States Patent and Trademark Office*